(12) United States Patent
Wu

(10) Patent No.: US 10,270,872 B2
(45) Date of Patent: Apr. 23, 2019

(54) INFORMATION PUSHING METHOD AND SYSTEM

(71) Applicant: SHENZHEN TCL DIGITAL TECHNOLOGY LTD., Shenzhen, Guangdong (CN)

(72) Inventor: Youzhao Wu, Guangdong (CN)

(73) Assignee: SHENZHEN TCL DIGITAL TECHNOLOGY LTD., Shenzhen, Guangdong (CN)

( * ) Notice: Subject to any disclaimer, the term of this patent is extended or adjusted under 35 U.S.C. 154(b) by 176 days.

(21) Appl. No.: 15/536,129

(22) PCT Filed: Dec. 19, 2014

(86) PCT No.: PCT/CN2014/094291
§ 371 (c)(1),
(2) Date: Jun. 14, 2017

(87) PCT Pub. No.: WO2016/095181
PCT Pub. Date: Jun. 23, 2016

(65) Prior Publication Data
US 2018/0020069 A1 Jan. 18, 2018

(30) Foreign Application Priority Data
Dec. 15, 2014 (CN) .......................... 2014 1 0779272

(51) Int. Cl.
*G06F 15/16* (2006.01)
*H04L 29/08* (2006.01)
(Continued)

(52) U.S. Cl.
CPC .............. *H04L 67/26* (2013.01); *G06F 16/71* (2019.01); *G06F 16/785* (2019.01);
(Continued)

(58) Field of Classification Search
CPC ......... H04L 67/26; H04L 67/10; G06F 16/71; G06F 16/7847; G06F 16/785;
(Continued)

(56) References Cited

U.S. PATENT DOCUMENTS 5,579,402 A * 11/1996 Hayen ..................... G06F 17/18
382/132
8,009,907 B1 * 8/2011 Srinivasan .............. G06T 5/009
382/168
(Continued)

*Primary Examiner* — Melvin H Pollack
(74) *Attorney, Agent, or Firm* — Winston Hsu

(57) ABSTRACT

A method for pushing information is disclosed by which a client acquires the statistical characteristic information of a current video frame in real time during video playback on the client; the client then searches a first mapping relationship table consisting of mapping relations between the statistical characteristic information and index values that is established by the client for the index value that matches the acquired statistical characteristic information, and sends the index value thus found to a cloud server; the cloud server searches a second mapping relationship table consisting of mapping relations between the index values and push information that is established by the cloud server for the push information that corresponds to the index value; and finally the client receives and plays or displays the push information. There is also provided a system for pushing information.

20 Claims, 3 Drawing Sheets

(51) Int. Cl.
  *G06F 16/71*   (2019.01)
  *G06F 16/783*  (2019.01)
  *G06F 16/78*   (2019.01)
  *G06K 9/46*        (2006.01)
  *G06K 9/62*        (2006.01)
  *G06T 5/40*        (2006.01)

(52) U.S. Cl.
  CPC ...... *G06F 16/7847* (2019.01); *G06F 16/7867* (2019.01); *G06K 9/4647* (2013.01); *G06K 9/4661* (2013.01); *G06K 9/6212* (2013.01); *G06T 5/40* (2013.01); *G06T 2207/10016* (2013.01); *H04L 67/10* (2013.01)

(58) Field of Classification Search
  CPC .............. G06F 16/7867; G06K 9/4647; G06K 9/4661; G06K 9/6212; G06T 2207/10016; G06T 5/40
  USPC ......................................................... 709/217
  See application file for complete search history.

(56) References Cited

U.S. PATENT DOCUMENTS

| | | | |
|---|---|---|---|
| 8,077,969 B2 * | 12/2011 | Rossato | G06T 7/194 |
| | | | 382/173 |
| 8,300,931 B2 * | 10/2012 | Lee | G06T 5/009 |
| | | | 358/523 |
| 8,582,666 B2 * | 11/2013 | Zuo | G06T 9/00 |
| | | | 375/240.29 |
| 8,704,909 B2 * | 4/2014 | Kanaris | H04N 19/60 |
| | | | 348/222.1 |
| 9,305,239 B2 * | 4/2016 | Litvak | G06T 7/11 |
| 9,355,327 B2 * | 5/2016 | Hirooka | G06K 9/46 |
| 9,405,970 B2 * | 8/2016 | Israel | G06F 3/017 |
| 9,415,310 B2 * | 8/2016 | Martini | G06T 7/0008 |
| 9,467,750 B2 * | 10/2016 | Banica | H04N 21/812 |
| 9,510,044 B1 * | 11/2016 | Pereira | H04N 21/44008 |
| 9,600,853 B2 * | 3/2017 | Jang | G06T 1/20 |
| 9,602,567 B2 * | 3/2017 | Trachtenberg | H04N 21/4307 |
| 9,712,724 B2 * | 7/2017 | Hirooka | H04N 5/21 |
| 9,728,117 B2 * | 8/2017 | Messmer | H04N 1/6058 |
| 9,736,526 B2 * | 8/2017 | Matejka | H04N 21/4314 |
| 9,749,376 B2 * | 8/2017 | Bologh | H04N 21/26216 |
| 9,875,489 B2 * | 1/2018 | Spitz | H04N 21/25866 |
| 9,888,279 B2 * | 2/2018 | Ishtiaq | H04N 21/23418 |
| 10,070,183 B2 * | 9/2018 | Kilar | H04N 21/4516 |
| 10,154,001 B2 * | 12/2018 | Green | G06F 16/435 |
| 2006/0143230 A1 * | 6/2006 | Thorpe | G06F 16/3347 |
| 2016/0253710 A1 * | 9/2016 | Publicover | H04W 4/21 |
| | | | 705/14.66 |
| 2016/0300376 A1 * | 10/2016 | Fuse | G06K 9/4661 |
| 2018/0316948 A1 * | 11/2018 | Todd | H04N 21/2365 |

* cited by examiner (a)

(b)

INFORMATION PUSHING METHOD AND SYSTEM

FIELD OF THE DISCLOSURE

Embodiments of the present disclosure relate generally to communications technology, and more particularly relate to methods and systems for pushing information.

BACKGROUND OF THE DISCLOSURE

In the prior art, during video playback the relevant information is usually pushed by the following two ways.

First, during video playback a matching picture area (a TV station logo or program icon) may be extracted from the played video frame. The information present in the matching picture area may then be identified using image recognition technology, and the identified information may be matched and retrieved in a database or network. Finally the retrieved result information may be sent as the push information to the user and displayed on a dedicated display area.

Second, during video playback the currently played video frame may be divided into multiple foci, and the image recognition technology may be employed to identify the corresponding image content (e.g., the image may be recognized as a product) of each focus, and then the push information corresponding to the image content may be searched and displayed on a dedicated display area.

Both the above two information push methods require the partitioning of image frames (either extraction of the matching picture area or division of foci) and image recognition technology. Thus, the image processing process is complex and the amount of data computation is high.

SUMMARY OF THE DISCLOSURE

A primary objective of the present disclosure is to address the problem in the prior art that the image processing process is complex and the data computation amount is high when the relevant information of the video frame is pushed during video playback.

To achieve the above object, there is provided a method for pushing information, the method including the following blocks:

block 1, acquiring, by a client in real time, the statistical characteristic information of the current video frame during video playback on the client;

block 2, searching in a first table of mapping relationships between the statistical characteristic information and index values for the index value that matches the acquired statistical characteristic information, and sending the searched index value to a cloud server, where the first mapping relationship table may be established by the client;

block 3, searching, by the cloud server, in a second table of mapping relationships between the index values and push information for the push information that corresponds to the searched index value, and sending the corresponding push information to the client, where the second mapping relationship table may be established by the cloud server; and block 4, receiving and playing or displaying the push information on the client.

The method may further include, subsequent to block 1:

determining, by the client, whether the acquired statistical characteristic information of the current video frame is consistent with the statistical characteristic information that last successfully matches an index value; and performing step 2 when they are inconsistent.

Acquiring the statistical characteristic information of the currently played video frame may include:

setting a sampling window for sampling the statistical characteristic information and obtaining from the sampling window the statistical characteristic information of the current video frame, according to the preset policy, where the preset policy may be to filter out the information that is superimposed on the current frame and that may affect the statistical characteristic information.

The statistical characteristic information of the current video frame may include the histogram information and/or the average pixel level value of the luminance signals of the current video frame prior to the picture quality processing of the current video frame.

Obtaining the histogram information of the luminance signals may include:

dividing the luminance signals in the sampling window into a number of $2^n$ gray levels which may then be compressed by a number of $2^i$ times, taking every $2^{n-i}$ of gray levels as a statistical interval and counting the number of pixels in each statistical interval into the corresponding level that may range from the 0th level to the $(2^{i-1})$th level in the histogram to obtain the histogram information of the luminance signals, where both n and i are positive integers; and obtaining the average pixel level value of the luminance signals may include:

obtaining the greyscale value of each sampling point in the sampling window and calculating an average greyscale value of all the sampling points, and taking the average greyscale value as the average pixel level value of the luminance signals.

To achieve the aforementioned object, there is also provided a system for pushing information, the system including:

a client configured to acquire in real time the statistical characteristic information of the current video frame during video playback on the client, search in a first table of mapping relationships between the statistical characteristic information and index values that is established by the client for the index value that matches the acquired statistical characteristic information, and send the searched index value to a cloud server, and receive and play or display the push information sent from the cloud server; and a cloud server configured to search in a second table of mapping relationships between the index values and push information for the push information that corresponds to the index value sent from the client and send the corresponding push information to the client, where the second mapping relationship table may be established by the cloud server.

The client may further be configured to determine, subsequent to acquiring the statistical characteristic information of the current video frame, whether the acquired statistical characteristic information of the current video frame is consistent with the statistical characteristic information that last successfully matches an index value, and if they are inconsistent, search in the first mapping relationship table for the index value that matches the acquired statistical characteristic information and send the searched index value to the cloud server.

In particular, the client may be configured to set a sampling window for sampling the statistical characteristic information and obtain from the sampling window the statistical characteristic information of the current video frame, according to the preset policy, where the preset policy may be to filter out the information that is superimposed on the current frame and that may affect the statistical characteristic information.

The statistical characteristic information of the current video frame may be the histogram information and/or the average pixel level value of the luminance signals of the current video frame prior to picture quality processing of the current video frame.

In particular, the client may be configured to divide the luminance signals in the sampling window into a number of $2^n$ gray levels which may then be compressed by a number of $2^i$ times, take every $2^{n-i}$ of gray levels as a statistical interval and count the number of pixels in each statistical interval into the corresponding level that may range from the 0th level to the $(2^{i-1})$th level in the histogram to obtain the histogram information of the luminance signals, where both n and i are positive integers; and/or obtain the greyscale value of each sampling point in the sampling window and calculate the average greyscale value of all the sampling points, and take the average greyscale value as the average pixel level value of the luminance signals.

According to the methods and systems for pushing information disclosed by the present disclosure, the client may acquire the statistical characteristic information of the current video frame in real time during video playback on the client. The client may then search in the first mapping relationship table consisting of mapping relations between the statistical characteristic information and the index values that is established by the client for the index value that matches the acquired statistical characteristic information, and send the index value thus found to the cloud server. The cloud server may search the second mapping relationship table consisting of the mapping relations between the index values and push information that is established by the cloud server for the push information that corresponds to the index value. Finally the client can receive and play or display the push information. Since the solution of the present disclosure does not require the partitioning of video frames and the image recognition technology, the image processing is simple and the data computation amount is low. Furthermore, because the client only sends the corresponding index values to the cloud server, and the cloud server would search for and feed back the corresponding push information, the amount of data traffic on the network channel can be effectively reduced and the data throughput of the cloud server can also be mitigated.

The foregoing objects, features and advantages of the present disclosure will be described in greater detail with reference to the accompanying drawings.

DETAILED DESCRIPTION OF THE EMBODIMENTS

It is to be appreciated that specific embodiments described herein are for illustration purposes only and are not intended as limiting the scope of the present disclosure.

Figure 1:
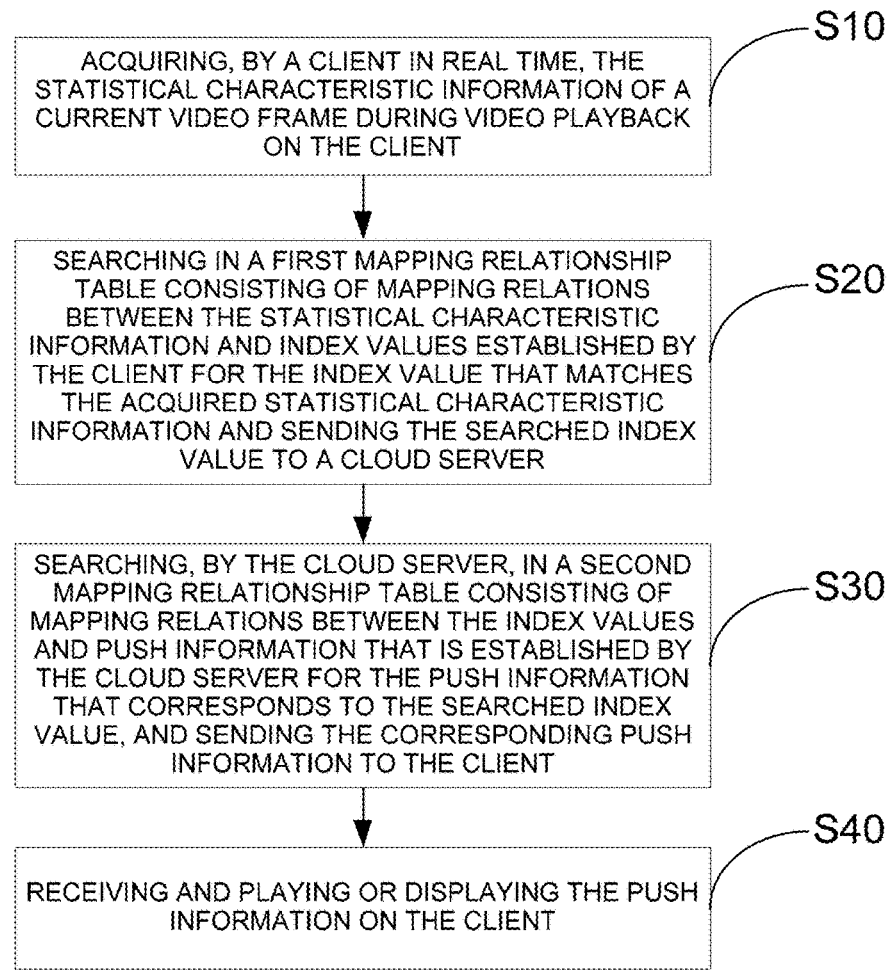
FIG. 1 shows a flowchart illustrating a method for pushing information according to an embodiment of the present disclosure.

The present disclosure provides a method for pushing information. Referring to FIG. 1, there is shown a flowchart of a method for pushing information according to an embodiment of the present disclosure. The method may comprise the following blocks.

In S10, a client may access in real time the statistical characteristic information of the current video frame during video playback on the client.

Figure 2:
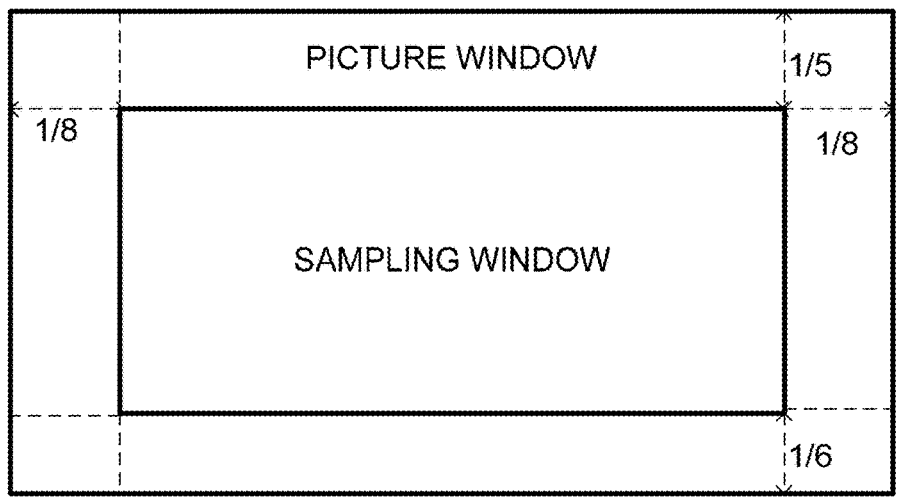
FIG. 2 illustrates a sampling window according to an embodiment of the present disclosure.

The source of an image frame of a video may be a television station, a DVD, a set-top box, a video site, or some other channel. A variety of information, e.g., a television station logo, Chinese and/or foreign language sub subtitles, rolling ads, etc., may be superimposed on different parts of the same video frame. If these information is sampled together during the sampling process, the corresponding statistical characteristic information of the same image frame in the same video that comes from different channels may differ greatly from one another. To avoid this, a sampling window for sampling the statistical characteristic information may be set in the present embodiment. That is, in block S10 the statistical characteristic information of the current video frame may be obtained specifically as follows: a sampling window for sampling the statistical characteristic information may be set and the statistical characteristic information may be obtained from the sampling window, according to a preset policy. The preset policy may be to filter out the information that is superimposed on the current video frame and that may affect the statistical characteristic information, such as a television station logo, a Chinese and/or foreign language subtitle, a rolling advertisement, and the like. Referring now to FIG. 2, there is shown a sampling window according to an embodiment of the present disclosure. The area of the sampling window typically may be an area remained of the video window after removing ⅕ of its top, ⅙ of its bottom, ⅛ of its left side, and ⅛ of its right side.

In the present embodiment, the statistical characteristic information of the current video frame may be used to characterize the contents of the current video frame. The statistical characteristic information of the current video frame may include the histogram information and/or the average pixel level value of the current video frame. That is, a video frame may have the corresponding histogram information and the corresponding average pixel level value. To put it another way, a piece of histogram information and a corresponding average pixel level value can characterize a frame. The histogram information may be represented by a statistical diagram depicting the distribution of all pixels of the corresponding picture frame in various gray levels, while the average pixel level value may be represented by the average of the quantized values of all the pixels in the corresponding picture.

In the prior art during video playback on the terminal equipment, the following image processing may be performed for each video frame: the signals whose color space is RGB or YUV may first be converted uniformly into YUV color space signals through color space conversion (CSC) matrices; then the YUV color space signals may be scaled by the Scaler to a unified resolution, and afterwards the luminance signals (Y signals) and UV signals can be outputted; the Y signals and the UV signals may then be quality-processed, and finally the quality-processed Y signals and UV signals can be displayed. In this kind of image processing mode, however, the corresponding statistical characteristic information of the same Y signals obtained after the picture quality processing of the Y signals performed on different terminals may differ, because the quality processing of the same Y signals can be different for different terminals. Thus to ensure that the corresponding statistical characteristic information of the same video frame played on different terminals holds the same, in the present embodiment the client may obtain the statistical characteristic information of the Y signals before the picture quality processing. Namely, the statistical characteristic information of the current video frame may be the histogram information and/or the average pixel level value of the Y signals of the current video frame prior to the picture quality processing.

In the present embodiment the histogram information of the luminance signals may be acquired by the following process: dividing the luminance signals in the sampling window into a number of $2^n$ gray levels which may then be compressed by a number of $2^i$ times, taking every $2^{n-i}$ of gray levels as a statistical interval and counting the number of pixels in each statistical interval into the corresponding level that ranges from the 0th level to the $(2^{i-1})$th level in the histogram to obtain the histogram information of the luminance signals, where both n and i are positive integers. If the Y signals are quantized to n-bit (usually 8-bit, 10-bit or 12-bit), then the Y value of a pixel may lie in the range of $0 \sim 2^{n-1}$, that is, the Y signals are divided into a number of $2^n$ gray levels, and the histogram information can be represented by the statistical diagram depicting the distribution of the pixels of the statistical characteristic information sampling window in the various gray levels. Typically, the gray levels may be compressed in order to simplify the statistics. If the Y signals are quantized by 8-bit, they may typically be compressed into $2^5$ or 32 levels. Every $2^{n-5}$, i.e., $2^3$ of the greyscale values of the Y signals may be taken as a statistical interval, and the number of pixels that fall in each statistical interval may be counted into the corresponding level 0~31, see FIG. 3 where there is illustrated the relationships between the histogram gray levels and the Y signal gray levels of a video frame. In particular, the pixels of which the Y signal greyscale values lie in the range 0~7 may be counted as a statistical interval into level 0 of the histogram, the pixels of which the Y signal greyscale values fall in the range of 8~15 may be counted into level 1 of the histogram, and so on, until the pixels whose Y signal greyscale values lie in the range 248~255 are counted into level 31 of the histogram, the histogram information of the sampling window can be so obtained, see FIG. 4 which illustrates the relationships between the number of pixels and the histogram gray levels of a video frame, where each array (H1, H2, H3, . . . , H29, H30, H31) represents the number of pixels in each level 0 to 31.

The average pixel level value of the luminance signals may be obtained by the following process: obtaining the greyscale value of each sampling point in the sampling window and calculating the average greyscale value of all the sampling points, and taking the average greyscale value as the average pixel level value of the luminance signals. Assume the greyscale value of each sampling point is am, where m takes a value that lies in the range (1, N), and the total number of sampling points is N, then the average pixel level value of the luminance signals in the sampling window would be APL=(a1+a2+. . . +aN)/N. The method may further proceed to S20.

In S20, the client may search in a first table of mapping relationships between the statistical characteristic information and index values for the index value that matches the acquired statistical characteristic information, and send the searched index value to a cloud server, where the first mapping relationship table may be established by the client itself. The first mapping relationship table may be a table of correspondences between the statistical characteristic information and the index values that is established in advance by the client according to a setup instruction input by the user.

In the present embodiment, prior to block S20 the client may need to determine whether the acquired statistical characteristic information of the current video frame is consistent with the statistical characteristic information that last successfully matches an index value, and may perform block S20 only when they are inconsistent.

If a matching index value is found in the first mapping relationship table for the currently acquired statistical characteristic information, namely the index value successfully matches the acquired statistical characteristic information, and the currently acquired statistical characteristic information is consistent with the statistical characteristic information that last successfully matches an index value in the mapping relationship table, then it may indicate that the corresponding index value of the currently obtained statistical characteristic information may be the same as the corresponding index value of the statistical characteristic information that last successfully matches the index value. Therefore, if the client sends the same index value that is found twice to the cloud server in turn, then the cloud server may send the same push information twice to the client. In order to prevent the cloud server from continuously sending the same push information twice to the client for the same video, the following solution may be adopted by the present embodiment: after obtaining the statistical characteristic information of the current video frame, the client may compare the obtained statistical characteristic information against the statistical characteristic information that last finds a successful match of index value in the mapping relationship table to determine whether they are consistent with each other, and if they are consistent, abort the subsequent operations including searching in the first mapping relationship table for the index value that matches the statistical characteristic information of the current video frame and feeding the index value found back to the cloud server, and may wait to obtain the statistical characteristic information of the next video frame. Otherwise if they are inconsistent, the client would perform the subsequent operations including searching in the first mapping relationship table for the index value that matches the statistical characteristic information of the current video frame and feeding the index value found back to the cloud server.

When comparing the obtained statistical characteristic information against the statistical characteristic information that last successfully finds a match of an index value, the match may be considered successful if the matching degree of the two reaches the set value, for example, if the matching degree reaches 98% or more, the match may be considered successful which means the two are consistent. Similarly, when the client searches in the first mapping relationship table for the index value that matches the statistical characteristic information obtained by the client, the obtained statistical characteristic information may also be compared against each entry of statistical characteristic information in the first mapping relationship table. When the matching degree of the obtained statistical characteristic information and a certain entry of statistical characteristic information reaches the set value, e.g., 98% or more, then the two may be considered a successful match, and so the corresponding index value of the certain statistical characteristic information would be considered as the corresponding index value of the obtained statistical characteristic information.

It can be known from the above that the statistical characteristic information may include the histogram information and/or the average pixel level value, so determining whether the corresponding statistical characteristic information of two video frames is consistent is actually about determining the matching degree of the histogram information of the two frames and/or the average pixel level values of the two frames. When the matching degree of the histogram information of the two video frames reaches the set value (e.g., if the matching degree reaches 98% or more) and/or the matching degree of the average pixel level values of the two video frames reaches the set value (e.g., if the matching degree reaches 98% or more), then the statistical characteristic information of the two frames may be considered consistent. The method may then proceed to block S30.

In S30, the cloud server may search in a second table of mapping relationships between the index values and push information for the push information that corresponds to the searched index value, and send the corresponding push information to the client, where the second mapping relationship table may be established by the cloud server.

The second mapping relationship table in the cloud server may be a table of correspondences between the index values and the push information that is established in advance in the cloud server according to the setup instruction input by the user. The index values in the first mapping relationship table may be the same as those in the second mapping relationship table.

In addition, the second mapping relationship table in the cloud server and the first mapping relationship table in the client can be updated according to the needs of the user. For example, a new mapping relation of an index value and the push information can be added into the second mapping relationship table, meanwhile a new mapping relation between the statistical characteristic information and the index value can be added into the first mapping relationship table; a mapping relation between an index value and push information can be deleted from the second mapping relationship table, and the mapping relation between certain statistical characteristic information and the index value can be deleted from the first mapping relationship table; or a mapping relation between an index value and push information can be altered. Further, in order to ensure that the information push can be successfully implemented for the picture frame that successfully matches an index value, the client may need to update the first mapping relationship table synchronously according to the updated second mapping relationship table in the cloud server. That is, the present embodiment may further include the process in which the cloud server may update the second mapping relationship table in real time according to the update instruction input by the user, and send the updated second mapping relationship table to the client, and the client may update its first mapping relationship table in real time according to the updated second mapping relationship table, so as to ensure that the first mapping relationship table can correspond to the second mapping relationship table. The method may then continue to block S40.

In S40, the client may receive and play or display the push information.

After the client receives the push information sent from the cloud server, a push information display box may pop up in the picture display window of the client and display the push information. Typically, the push information display box may be arranged at the lower left corner of the picture display window. The push information can include an abstract and a network link of the target information, and the user can click to close the push information display box or click on the associated network link to view the target information, based on the abstract of the target information. After the client receives and displays the push information, the push information may be shown continuously if the user doesn't perform any related operation, and may only update and play or display the next piece of push information until the next push information is fed back from the cloud server.

According to the above method embodiment for pushing information disclosed by the present disclosure, the client may acquire the statistical characteristic information of the current video frame in real time during video playback on the client. The client may then search in the first mapping relationship table consisting of mapping relations between the statistical characteristic information and the index values that is established by the client for the index value that matches the acquired statistical characteristic information, and send the index value thus found to the cloud server. The cloud server may search the second mapping relationship table consisting of the mapping relations between the index values and push information that is established by the cloud server for the push information that corresponds to the index value. Finally the client can receive and play or display the push information. Since the solution of the present embodiment does not require the partitioning of video frames and the image recognition technology, the image processing is simple and the data computation amount is low. Furthermore, because the client only sends the corresponding index values to the cloud server, and the cloud server would search for and feed back the corresponding push information, the amount of data traffic on the network channel can be effectively reduced and the data throughput of the cloud server can also be mitigated.

Figure 5:
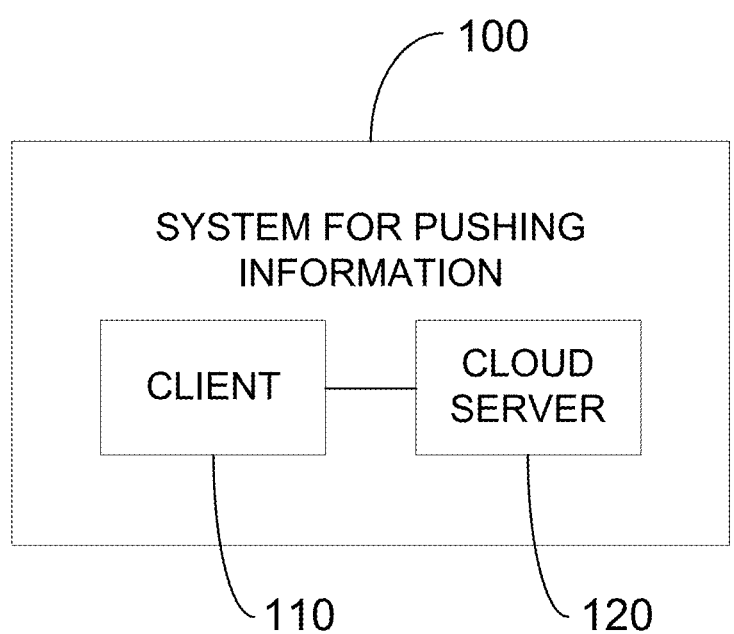
FIG. 5 shows a block diagram illustrating a system for pushing information according to an embodiment of the present disclosure.

There is also provided a system for pushing information. Referring now to FIG. 5, there is shown a block diagram illustrating a system for pushing information according to an embodiment of the present disclosure. The system 100 may include a client 110 and a cloud server 120.

The client 110 may be configured to acquire in real time the statistical characteristic information of the current video frame during video playback on the client 110, search in a first table of mapping relationships between the statistical characteristic information and index values that is established by the client 110 itself for the index value that matches the acquired statistical characteristic information, send the searched index value to the cloud server 120, and receive and play or display the push information sent from the cloud server 120.

The cloud server 120 may be configured to search in a second table of mapping relationships between the index values and push information for the push information that corresponds to the index value sent from the client 110 and send the corresponding push information to the client 110, where the second mapping relationship table may be established by the cloud server 120.

The source of an image frame of a video may be a television station, a DVD, a set-top box, a video site, or some other channel. A variety of information, e.g., a television station logo, Chinese and/or foreign language sub subtitles, rolling ads, etc., may be superimposed on different parts of the same video frame. If these information is sampled together during the sampling process, the corresponding statistical characteristic information of the same image frame in the same video that comes from different channels may differ greatly from one another. To avoid this, a sampling window for sampling the statistical characteristic information may be set in the present embodiment. That is, the client 110 may particularly be configured to set a sampling window for sampling the statistical characteristic information and obtain the statistical characteristic information from the sampling window, according to a preset policy. The preset policy may be to filter out the information that is superimposed on the current video frame and that may affect the statistical characteristic information, such as a television station logo, a Chinese and/or foreign language subtitle, a rolling advertisement, and the like. Referring back to FIG. 2, the area of the sampling window may be an area remained of the video window after removing ⅕ of its top, ⅙ of its bottom, ⅛ of its left side, and ⅛ of its right side.

In the present embodiment, the statistical characteristic information of the current video frame may be used to characterize the contents of the current video frame. The statistical characteristic information of the current video frame may include the histogram information and/or the average pixel level value of the current video frame. That is, a video frame may have the corresponding histogram information and the corresponding average pixel level value. To put it another way, a piece of histogram information and a corresponding average pixel level value can characterize a frame. The histogram information may be represented by a statistical diagram depicting the distribution of all pixels of the corresponding picture frame in various gray levels, while the average pixel level value may be represented by the average of the quantized values of all the pixels in the corresponding picture.

In the prior art during the video playback on the terminal equipment, the following image processing may be performed for each video frame: the signals whose color space is RGB or YUV may first be converted uniformly into YUV color space signals through color space conversion (CSC) matrices; then the YUV color space signals may be scaled by the Scaler to a unified resolution, and afterwards the luminance signals (Y signals) and UV signals would be outputted; the Y signals and the UV signals may then be quality-processed, and finally the quality-processed Y signals and UV signals can be displayed. In this kind of image processing mode, however, the corresponding statistical characteristic information of the same Y signals obtained after the picture quality processing of the Y signals performed on different terminals may differ, because the quality processing of the same Y signals can be different for different terminals. Thus to ensure that the corresponding statistical characteristic information of the same video frame played on different terminals holds the same, in the present embodiment the client 110 may obtain the statistical characteristic information of the Y signals before the picture quality processing. Namely, the statistical characteristic information of the current video frame may be the histogram information and/or the average pixel level value of the luminance signals of the current video frame prior to the picture quality processing.

Figure 3:
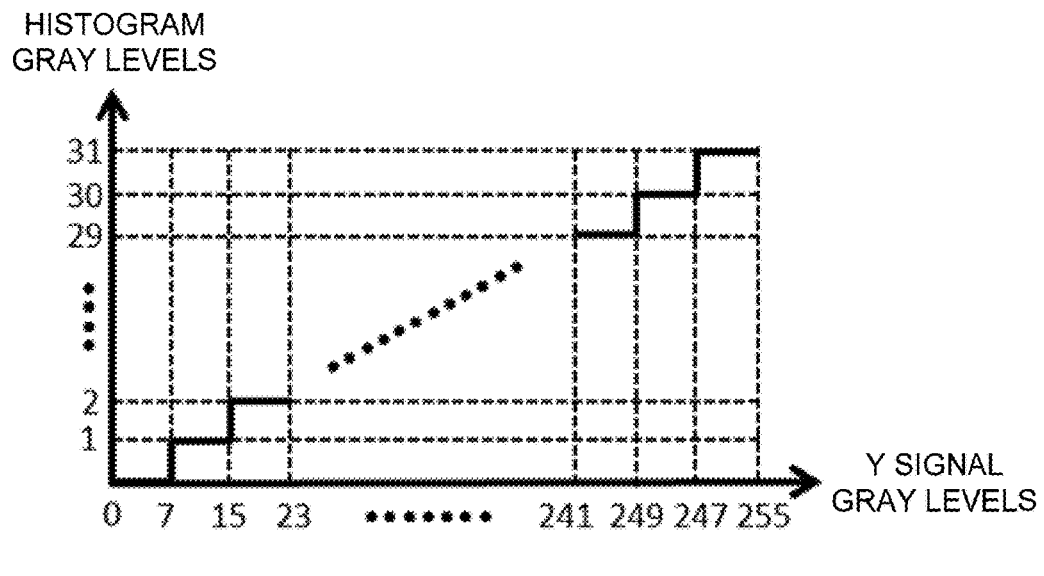
FIG. 3 illustrates the relationships between the histogram gray levels and the Y-signal gray levels of a video frame according to an embodiment of the present disclosure.
Figure 4:
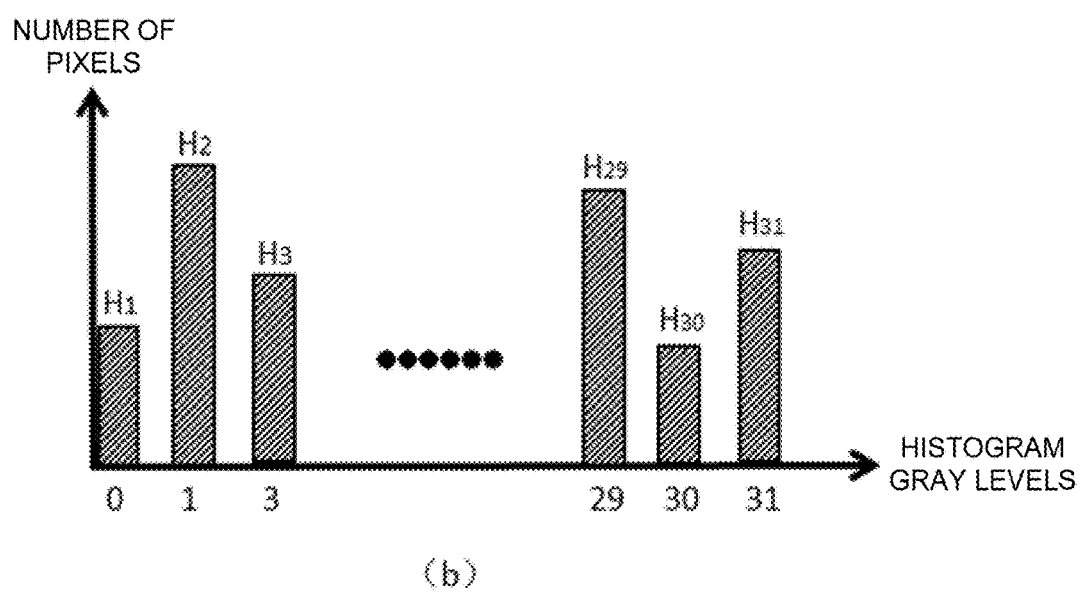
FIG. 4 illustrates the relationships between the number of pixels and the histogram gray levels of a video frame according to an embodiment of the present disclosure.

In the present embodiment, the client 110 may be configured to divide the luminance signals in the sampling window into a number of $2^n$ gray levels which may then be compressed by a number of $2^i$ times, take every $2^{n-i}$ of gray levels as a statistical interval and count the number of pixels in each statistical interval into the corresponding level that ranges from the 0th level to the $(2^{i-1})$th level in the histogram to obtain the histogram information of the luminance signals, where both n and i are positive integers; and/or obtain the greyscale value of each sampling point in the sampling window and calculate the average greyscale value of all the sampling points, and take the average greyscale value as the average pixel level value of the luminance signals. For the histogram information of the luminance signals, if the Y signals are quantized to n-bit (usually 8-bit, 10-bit or 12-bit), then the Y value of a pixel may lie in the range of $0\sim2^{n-1}$, that is, the Y signals are divided into a number of $2^n$ gray levels, and the histogram information can be represented by the statistical diagram depicting the distribution of the pixels of the statistical characteristic information sampling window in the various gray levels. Typically, the gray levels may be compressed in order to simplify the statistics. If the Y signals are quantized by 8-bit, typically they may be compressed into $2^5$ or 32 levels. Every $2^{n-5}$, i.e., $2^3$ of the greyscale values of the Y signals may be taken as a statistical interval, and the number of pixels that fall in each statistical interval may be counted into the corresponding level 0~31. Referring now to FIG. 3, in particular, the pixels of which the Y signal greyscale values lie in the range 0~7 may be counted as a statistical interval into level 0 of the histogram, the pixels of which the Y signal greyscale values fall in the range of 8~15 may be counted into level 1 of the histogram, and so on, until the pixels whose Y signal greyscale values lie in the range 248~255 are counted into the 31 of the histogram, the histogram information of the sampling window can be so obtained. Referring to FIG. 4, in which each array (H1, H2, H3, . . . , H29, H30, H31) represents the number of pixels in each level 0 to 31. For the average pixel level value of the luminance signals, assume the greyscale value of each sampling point is am, where m takes a value that lies in the range (1, N), and the total number of sampling points is N, then the average pixel level value of the luminance signals in the sampling window would be APL=(a1+a2+. . . +aN)/N.

In the present embodiment, the client 110 may further be configured to determine, subsequent to acquiring the statistical characteristic information of the current video frame, whether the acquired statistical characteristic information of the current video frame is consistent with the statistical characteristic information that last successfully matches an index value in the mapping relationship table, and, if they are inconsistent, search in the first mapping relationship table for the index value that matches the acquired statistical characteristic information and send the searched index value to the cloud server 120.

If a matching index value is found in the first mapping relationship table for the currently acquired statistical characteristic information, namely the index value is found successfully matches the acquired statistical characteristic information, and the currently acquired statistical characteristic information is consistent with the statistical characteristic information that last successfully matches an index value in the mapping relationship table, then it may indicate that the corresponding index value of the currently obtained statistical characteristic information may be the same as the corresponding index value of the statistical characteristic information that last successfully matches the index value. Therefore, if the client 110 sends the same index value that is found twice to the cloud server 120 in turn, then the cloud server 120 may send the same push information twice to the client 110. In order to prevent the cloud server 120 from continuously pushing the same push information twice to the client 110 for the same video, the following solution may be adopted by the present embodiment: after obtaining the statistical characteristic information of the current video frame, the client 110 may compare the obtained statistical characteristic information against the statistical characteristic information that last finds a successful match of index value in the mapping relationship table to determine whether they are consistent with each other, and if they are consistent, abort the subsequent operations including searching in the first mapping relationship table for the index value that matches the statistical characteristic information of the current video frame and feeding the index value found back to the cloud server 120, and may wait to obtain the statistical characteristic information of the next video frame. Otherwise if they are inconsistent, the client 110 would perform the subsequent operations including searching in the first mapping relationship table for the index value that matches the statistical characteristic information of the current video frame and feeding the index value found back to the cloud server 120.

When comparing the obtained statistical characteristic information against the statistical characteristic information that last successfully finds a match of an index value, the match may be considered successful if the matching degree of the two reaches the set value, for example, if the matching degree reaches 98% or more, the match may be considered successful which means the two are consistent. Similarly, when the client 110 searches in the first mapping relationship table for the index value that matches the statistical characteristic information obtained by the client 110, the obtained statistical characteristic information may also be compared against each entry of statistical characteristic information in the first mapping relationship table. When the matching degree of the obtained statistical characteristic information and a certain entry of statistical characteristic information reaches the set value, e.g., 98% or more, then the two may be considered a successful match, and so the corresponding index value of the certain statistical characteristic information would be considered as the corresponding index value of the obtained statistical characteristic information.

It can be known from the above that the statistical characteristic information may include the histogram information and/or the average pixel level value, so determining whether the corresponding statistical characteristic information of two video frames is consistent is actually about determining the matching degree of the histogram information of the two frames and/or the average pixel level values of the two frames. When the matching degree of the histogram information of the two video frames reaches the set value (e.g., if the matching degree reaches 98% or more) and/or the matching degree of the average pixel level values of the two video frames reaches the set value (e.g., if the matching degree reaches 98% or more), then the statistical characteristic information of the two frames may be considered consistent.

The first mapping relationship table in the client 110 may be a table of correspondences between the statistical characteristic information and the index values that is established in advance by the client 110 according to the setup instruction input by the user. The second mapping relationship table in the cloud server 120 may be a table of correspondences between the index values and the push information that is established in advance in the cloud server 120 according to the setup instruction input by the user. The index values in the first mapping relationship table may be the same as those in the second mapping relationship table.

In addition, the second mapping relationship table in the cloud server 120 and the first mapping relationship table in the client 110 can be updated according to the needs of the user. For example, a new mapping relation of an index value and push information can be added into the second mapping relationship table, meanwhile a new mapping relation between the statistical characteristic information and the index value can be added into the first mapping relationship table; a mapping relation between an index value and push information can be deleted from the second mapping relationship table, and the mapping relation between certain statistical characteristic information and the index value can be deleted from the first mapping relationship table; or a mapping relation between an index value and push information can be altered. Further, in order to ensure that the information push can be successfully implemented for the picture frame that successfully matches an index value, the client 110 may need to update the first mapping relationship table synchronously according to the updated second mapping relationship table in the cloud server 120. That is, in the present embodiment the cloud server 120 may further be configured to update the second mapping relationship table in real time according to the update instruction input by the user, and send the updated second mapping relationship table to the client 110. The client 110 may be configured to update its first mapping relationship table in real time according to the updated second mapping relationship table, so as to ensure that the first mapping relationship table can correspond to the second mapping relationship table.

After the client 110 receives the push information sent from the cloud server 120, a push information display box may pop up in the picture display window of the client 110 and display the push information. Typically, the push information display box may be arranged at the lower left corner of the picture display window. The push information can include an abstract and a network link of the target information, and the user can click to close the push information display box or click on the associated network link to view the target information, based on the abstract of the target information. After the client 110 receives and displays the push information, the push information may be shown continuously if the user doesn't perform any related operation, and may only update and play or display the next piece of push information until the next push information is fed back from the cloud server 120.

According to the above system embodiment for pushing information disclosed by the present disclosure, the client 110 may access the statistical characteristic information of the current video frame in real time during video playback on the client 110. The client 110 may then search the first mapping relationship table consisting of mapping relations between the statistical characteristic information and the index values that is established by the client 110 for the index value that matches the acquired statistical characteristic information, and send the index value thus found to the cloud server 120. The cloud server 120 may search the second mapping relationship table consisting of the mapping relations between the index values and push information that is established by the cloud server 120 for the push information that corresponds to the index value. Finally the client 110 can receive and play or display the push information. Since the solution of the present embodiment does not require the partitioning of video frames and the image recognition technology, the image processing is simple and the data computation amount is low. Furthermore, because the client 110 only sends the corresponding index values to the cloud server 120, while the cloud server 120 would search for and feed back the corresponding push information, the amount of data traffic on the network channel can be effectively reduced and the data throughput of the cloud server 120 can also be mitigated.

The foregoing specification merely depicts some exemplary embodiments of the present disclosure and therefore is not intended as limiting the scope of the disclosure. Any equivalent structural or flow transformations made to the disclosure, or any direct or indirect applications of the disclosure on any other related fields, shall all fall in the protection of the disclosure.

What is claimed is:

1. A method for pushing information, comprising:
acquiring, by a client in real time, statistical characteristic information of a current video frame during video playback on the client;
searching in a first table of mapping relationships between the statistical characteristic information and index values for an index value that matches the acquired statistical characteristic information, and sending the searched index value to a cloud server, wherein the first mapping relationship table is established by the client;
searching, by the cloud server, in a second table of mapping relationships between the index values and push information for the push information that corresponds to the searched index value, and sending the corresponding push information to the client, wherein the second mapping relationship table is established by the cloud server; and
receiving and playing or displaying the push information by the client.

2. The method according to claim 1, wherein the statistical characteristic information of the current video frame comprises histogram information and/or an average pixel level value of luminance signals of the current video frame prior to picture quality processing of the current video frame.

3. The method according to claim 2, wherein obtaining the histogram information of the luminance signals comprises:
dividing the luminance signals in a sampling window into a number of 2n gray levels which are then compressed by a number of 2i times, taking every 2n-i of gray levels as a statistical interval and counting the number of pixels in each statistical interval into the corresponding level that ranges from the 0th level to the (2i-1)th level in the histogram to obtain the histogram information of the luminance signals, both n and i being positive integers; and
obtaining the average pixel level value of the luminance signals comprises:
obtaining a greyscale value of each sampling point in the sampling window and calculating an average greyscale value of all the sampling points, and taking the average greyscale value as the average pixel level value of the luminance signals.

4. The method according to claim 1, further comprising, subsequent to acquiring the statistical characteristic information of the current video frame:
determining, by the client, whether the acquired statistical characteristic information of the current video frame is consistent with the statistical characteristic information that last successfully matches an index value; and
performing block 2searching in the first mapping relationship table for the index value that matches the acquired statistical characteristic information and sending the searched index value to the cloud server when they are inconsistent.

5. The method according to claim 4, wherein the statistical characteristic information of the current video frame comprises histogram information and/or an average pixel level value of luminance signals of the current video frame prior to picture quality processing of the current video frame.

6. The method according to claim 5, wherein obtaining the histogram information of the luminance signals comprises:
dividing the luminance signals in a sampling window into a number of 2n gray levels which are then compressed by a number of 2i times, taking every 2n-i of gray levels as a statistical interval and counting the number of pixels in each statistical interval into the corresponding level that ranges from the 0th level to the (2i-1)th level in the histogram to obtain the histogram information of the luminance signals, both n and i being positive integers; and
obtaining the average pixel level value of the luminance signals comprises:
obtaining a greyscale value of each sampling point in the sampling window and calculating an average greyscale value of all the sampling points, and taking the average greyscale value as the average pixel level value of the luminance signals.

7. The method according to claim 1, wherein acquiring the statistical characteristic information of the currently played video frame comprises:
setting a sampling window for sampling the statistical characteristic information and obtaining the statistical characteristic information from the sampling window, according to a preset policy.

8. The method according to claim 7, wherein the preset policy is to filter out the information that is superimposed on the current played video frame and that affects the statistical characteristic information.

9. The method according to claim 8, wherein the statistical characteristic information of the current video frame comprises histogram information and/or an average pixel level value of luminance signals of the current video frame prior to picture quality processing of the current video frame.

10. The method according to claim 9, wherein obtaining the histogram information of the luminance signals comprises:
dividing the luminance signals in the sampling window into a number of 2n gray levels which are then compressed by a number of 2i times, taking every 2n-i of gray levels as a statistical interval and counting the number of pixels in each statistical interval into the corresponding level that ranges from the 0th level to the (2i-1)th level in the histogram to obtain the histogram information of the luminance signals, both n and i being positive integers; and
obtaining the average pixel level value of the luminance signals comprises:
obtaining a greyscale value of each sampling point in the sampling window and calculating an average greyscale value of all the sampling points, and taking the average greyscale value as the average pixel level value of the luminance signals.

11. A system for pushing information, comprising:
a client configured to acquire in real time statistical characteristic information of a current video frame during video playback on the client, search in a first table of mapping relationships between the statistical characteristic information and index values that is established by the client for the index value that matches the acquired statistical characteristic information, send the searched index value to a cloud server, and receive and play or display push information sent from the cloud server; and
a cloud server configured to search in a second table of mapping relationships between the index values and push information for the push information that corresponds to the index value sent from the client and send the corresponding push information to the client, wherein the second mapping relationship table is established by the cloud server.

12. The system according to claim 11, wherein the statistical characteristic information of the current video frame comprises histogram information and/or an average pixel level value of luminance signals of the current video frame prior to picture quality processing of the current video frame.

13. The system according to claim 12, wherein the client is configured to divide the luminance signals in a sampling window into a number of 2n gray levels and compress them by a number of 2i times, take every 2n-i of gray levels as a statistical interval and count the number of pixels in each statistical interval into the corresponding level that ranges from the 0th level to the (2i-1)th level in the histogram to obtain the histogram information of the luminance signals, where both n and i are positive integers; and/or obtain a greyscale value of each sampling point in the sampling window and calculate an average greyscale value of all the sampling points, and take the average greyscale value as the average pixel level value of the luminance signals.

14. The system according to claim 11, wherein the client is further configured to determine, subsequent to acquiring the statistical characteristic information of the current video frame, whether the acquired statistical characteristic information of the current video frame is consistent with the statistical characteristic information that last successfully matches an index value, and, if they are inconsistent, search in the first mapping relationship table for the index value that matches the acquired statistical characteristic information and send the searched index value to the cloud server.

15. The system according to claim 14, wherein the statistical characteristic information of the current video frame comprises histogram information and/or an average pixel level value of luminance signals of the current video frame prior to picture quality processing of the current video frame.

16. The system according to claim 15, wherein the client is configured to divide the luminance signals in a sampling window into a number of 2n gray levels and compress them by a number of 2i times, take every 2n-i of gray levels as a statistical interval and count the number of pixels in each statistical interval into the corresponding level that ranges from the 0th level to the (2i-1)th level in the histogram to obtain the histogram information of the luminance signals, where both n and i are positive integers; and/or obtain a greyscale value of each sampling point in the sampling window and calculate an average greyscale value of all the sampling points, and take the average greyscale value as the average pixel level value of the luminance signals.

17. The system according to claim 11, wherein the client is configured to set a sampling window for sampling the statistical characteristic information and obtain the statistical characteristic information from the sampling window, according to a preset policy.

18. The system according to claim 17, wherein the preset policy is to filter out the information that is superimposed on the current video frame and that affects the statistical characteristic information.

19. The system according to claim 18, wherein the statistical characteristic information of the current video frame comprises histogram information and/or an average pixel level value of luminance signals of the current video frame prior to picture quality processing of the current video frame.

20. The system according to claim 19, wherein the client is configured to divide the luminance signals in the sampling window into a number of 2n gray levels and compress them by a number of 2i times, take every 2n-i of gray levels as a statistical interval and count the number of pixels in each statistical interval into the corresponding level that ranges from the 0th level to the (2i-1)th level in the histogram to obtain the histogram information of the luminance signals, where both n and i are positive integers; and/or obtain a greyscale value of each sampling point in the sampling window and calculate an average greyscale value of all the sampling points, and take the average greyscale value as the average pixel level value of the luminance signals.

\* \* \* \* \*